United States Patent [19]

Shaffer et al.

[11] 4,024,968
[45] May 24, 1977

[54] HEAVY LIFT SIDE LOADER TRUCK

[75] Inventors: Walter M. Shaffer, Peoria, Ill.; James R. Doyle, Salem, Oreg.; Victor V. Virostek, Mentor, Ohio

[73] Assignee: Towmotor Corporation, Mentor, Ohio

[22] Filed: Sept. 2, 1975

[21] Appl. No.: 609,888

[52] U.S. Cl. .............................. 214/75 G; 214/670; 296/28 C
[51] Int. Cl.² ............................................. B60P 1/54
[58] Field of Search .................. 180/1 R, 89 R; 214/75 R, 75 G, 670, 730; 280/638, 656; 296/28 C

[56] References Cited

UNITED STATES PATENTS

| | | | |
|---|---|---|---|
| 2,324,817 | 7/1943 | Bratley | 214/670 |
| 3,119,506 | 1/1964 | Bridge et al. | 214/670 |
| 3,198,541 | 8/1965 | Christenson et al. | 280/91 |
| 3,586,183 | 6/1971 | Shaffer | 214/75 G |
| 3,616,953 | 11/1971 | Shaffer et al. | 280/638 X |
| 3,721,077 | 3/1973 | Van Der Lely | 180/89 R X |
| 3,785,515 | 1/1974 | Shaffer | 214/75 G |
| 3,791,540 | 2/1974 | Breitfuss | 280/638 X |
| 3,884,321 | 5/1975 | Drake et al. | 180/89 R |
| 3,891,264 | 6/1975 | Hunter et al. | 180/89 R X |

Primary Examiner—Lawrence J. Oresky
Attorney, Agent, or Firm—Phillips, Moore, Weissenberger, Lempio & Majestic

[57] ABSTRACT

A load handling vehicle is provided which comprises a generally elongated body having a pair of traversable masts thereon for side loading and unloading long and heavy loads. The masts are provided with articulating booms suspended from a horizontal spreader for grasping cargo containers by twist locks on their extremities. Means are provided for traversing the masts to the side of the body so that the load may be deposited thereon for travel. The body is equipped with motive power means for propelling the vehicle. Wheels at the four corners of the vehicle provide support and means for moving the vehicle sideways to the longitudinal direction of travel for picking up and depositing loads. Segments in the form of telescoping track members of the vehicle body can be extended so as to provide greater lateral stability when picking up and depositing loads. Enhanced operator visibility is provided by means of a pantograph mounted cab which is movable to various positions suited for the roading, loading and unloading modes of operation of the vehicle.

34 Claims, 16 Drawing Figures

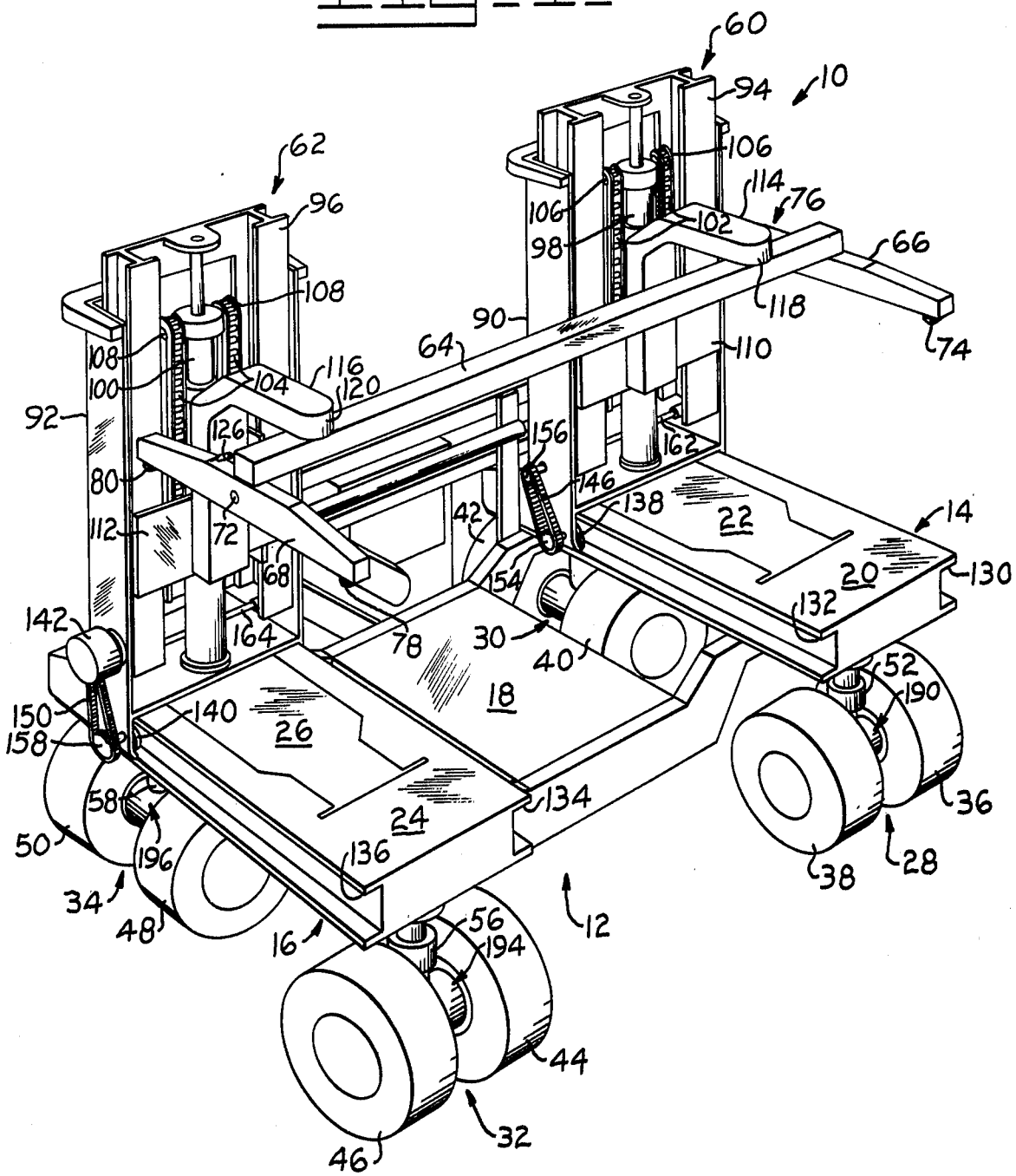

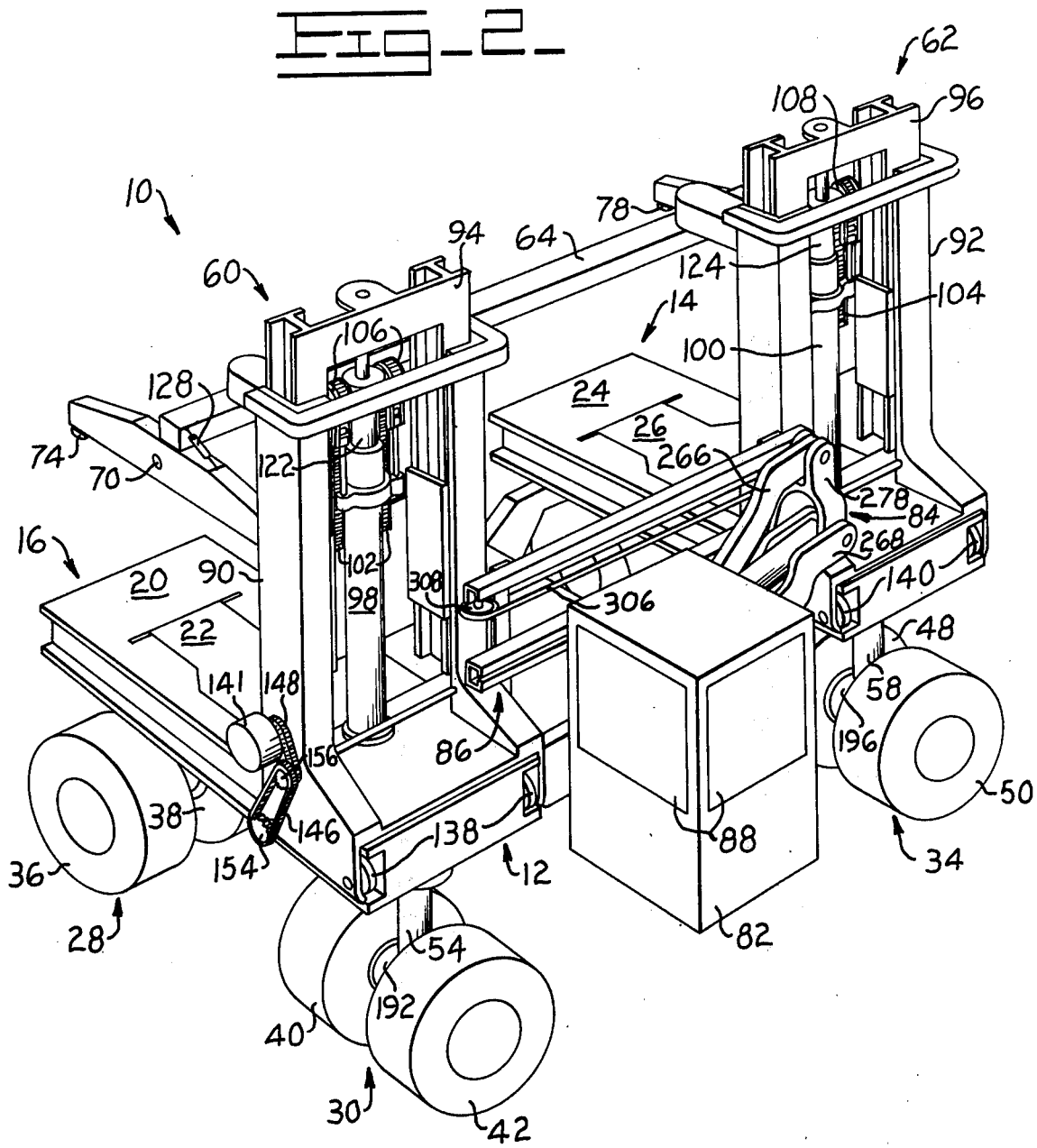

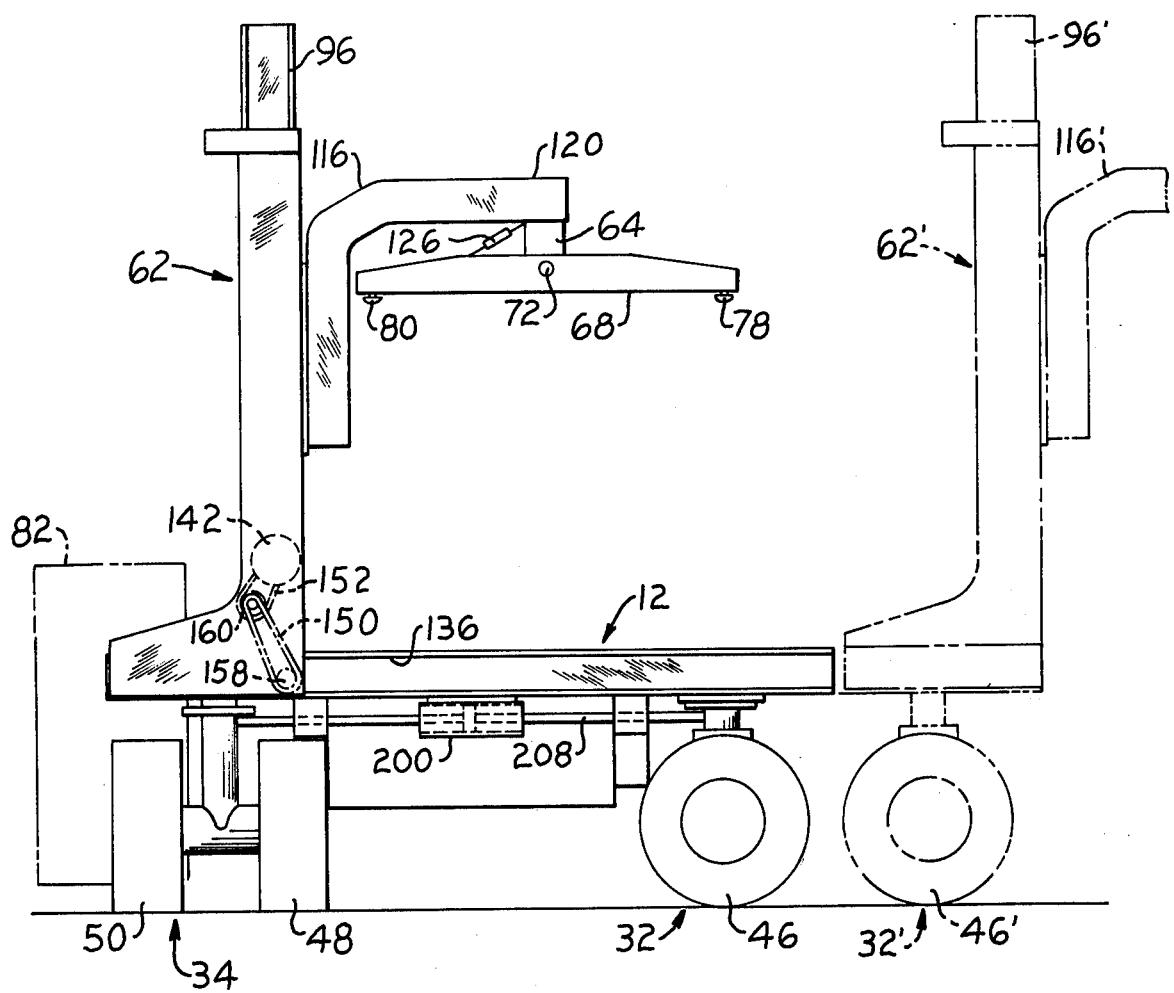

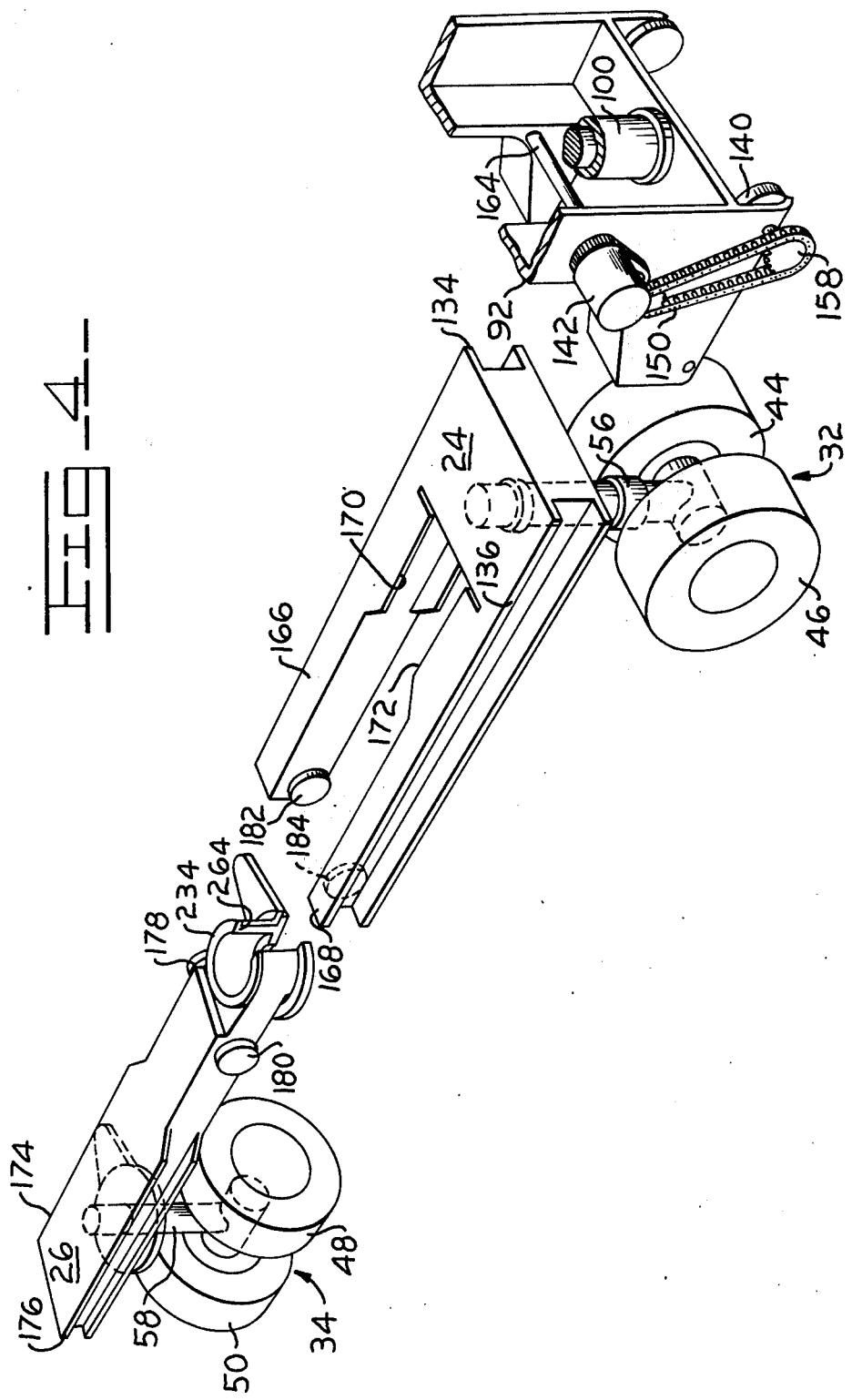

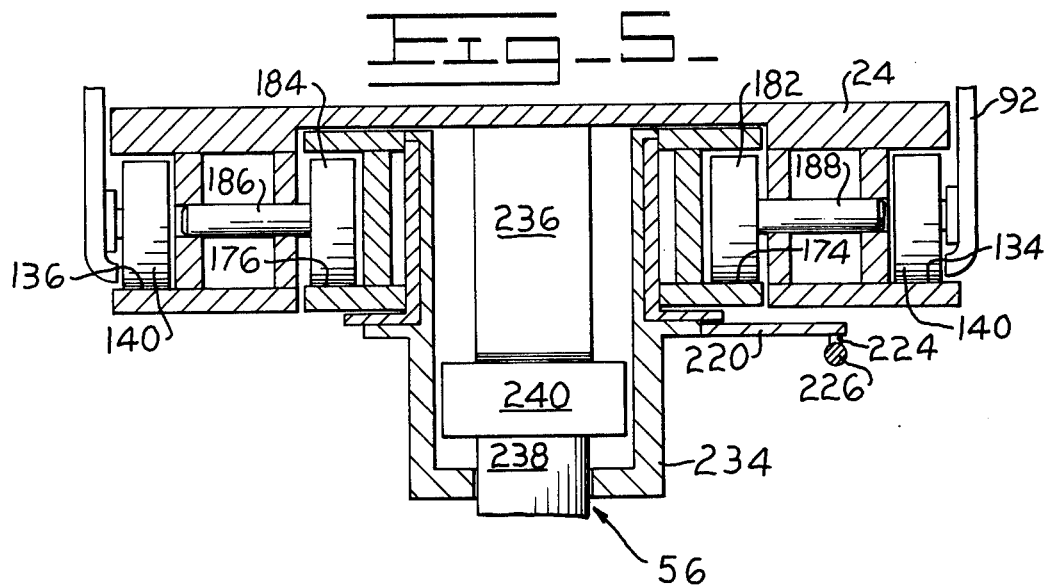
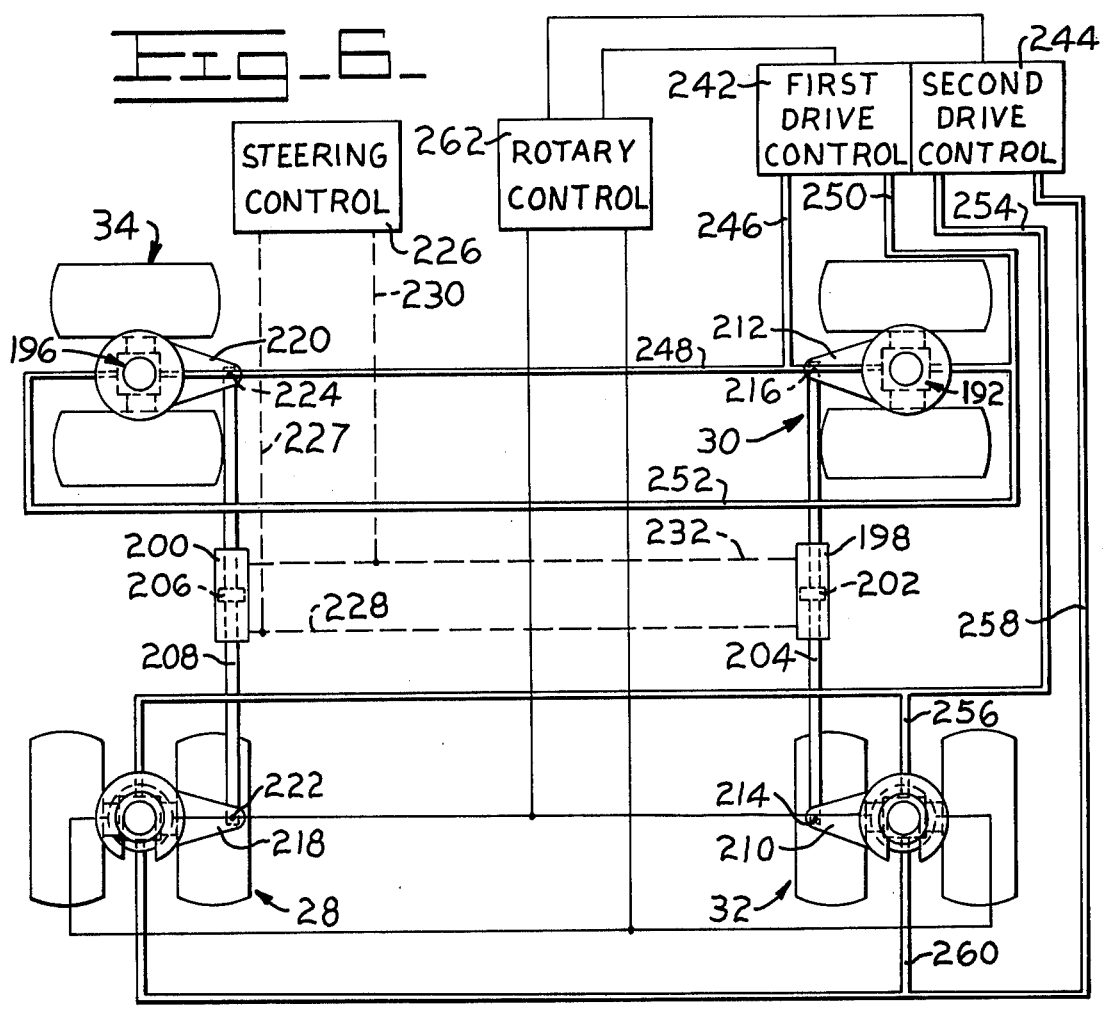

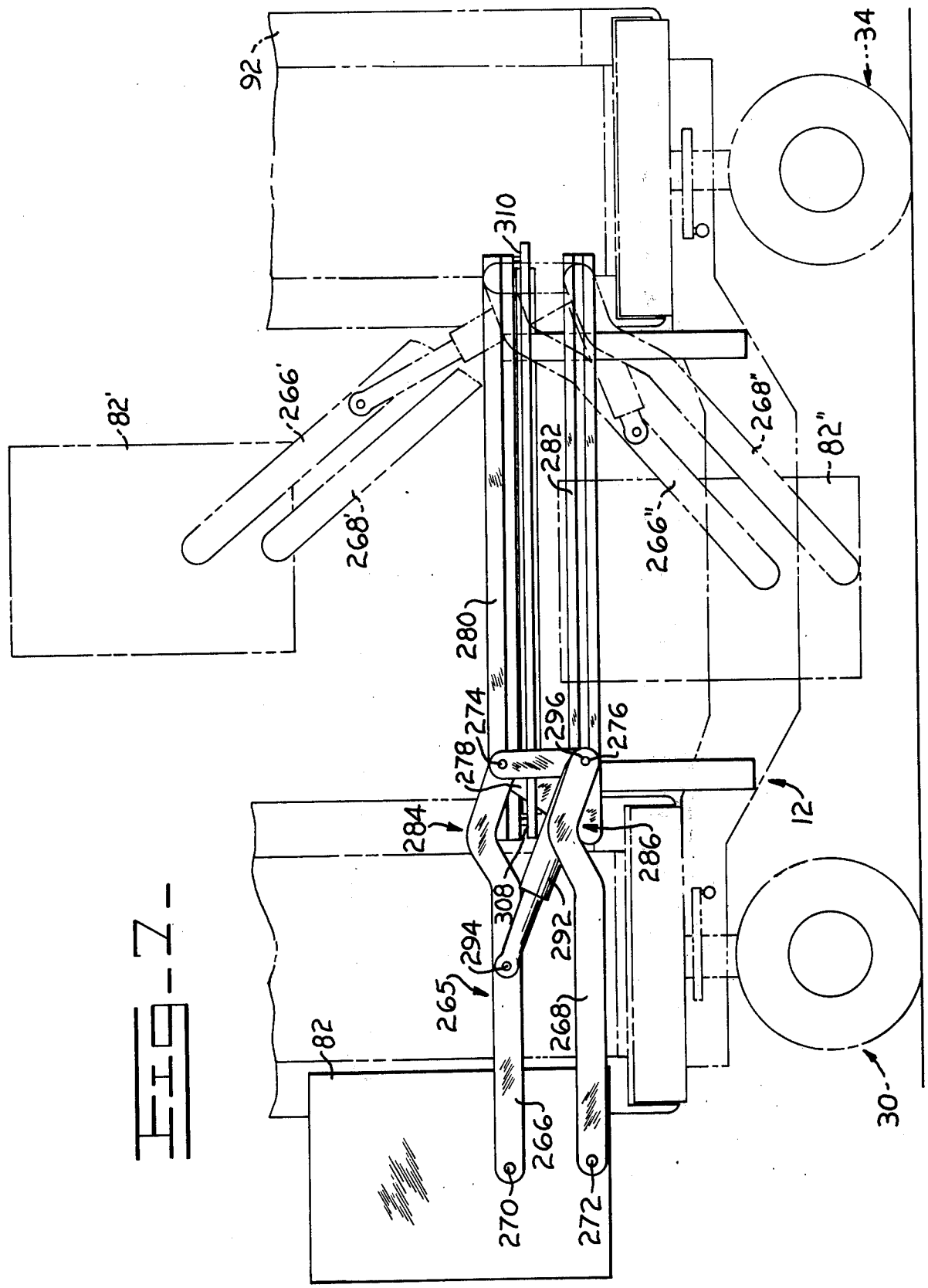

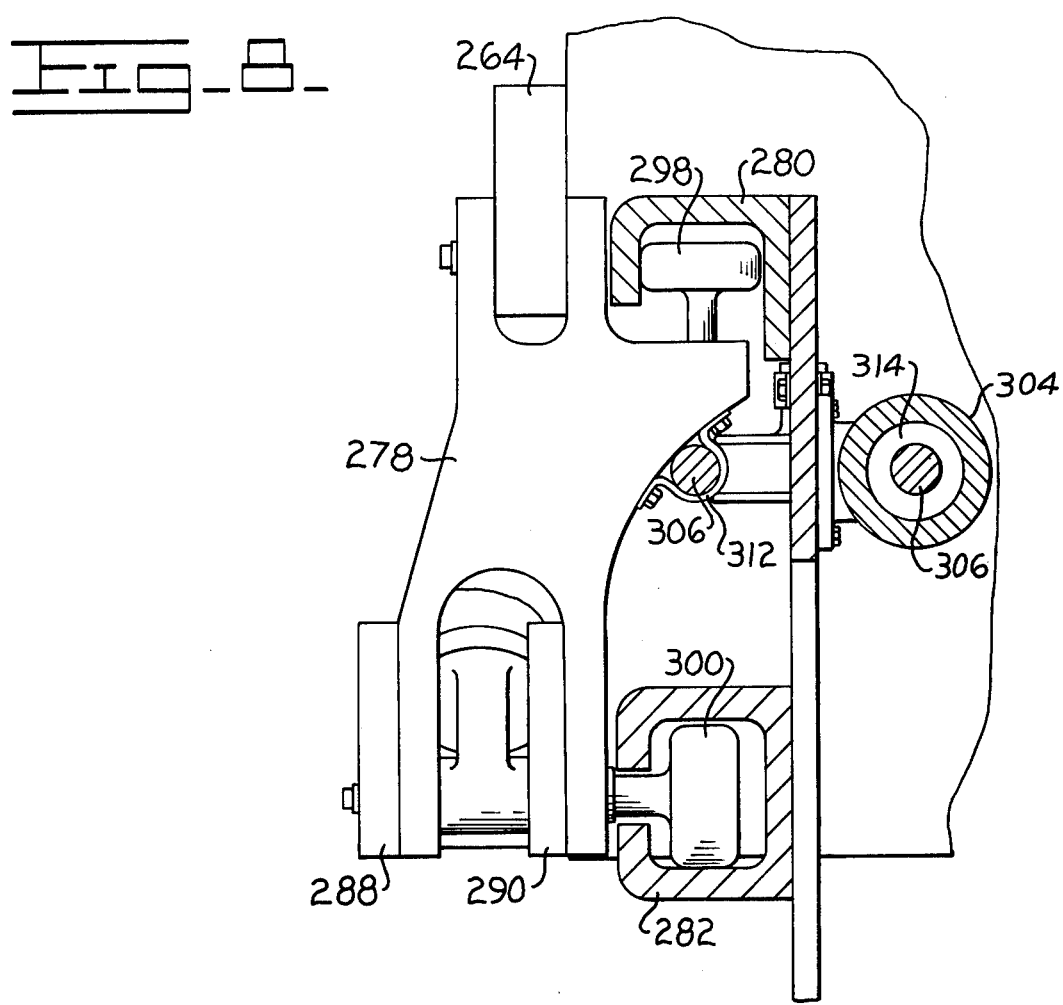
Fig-8-
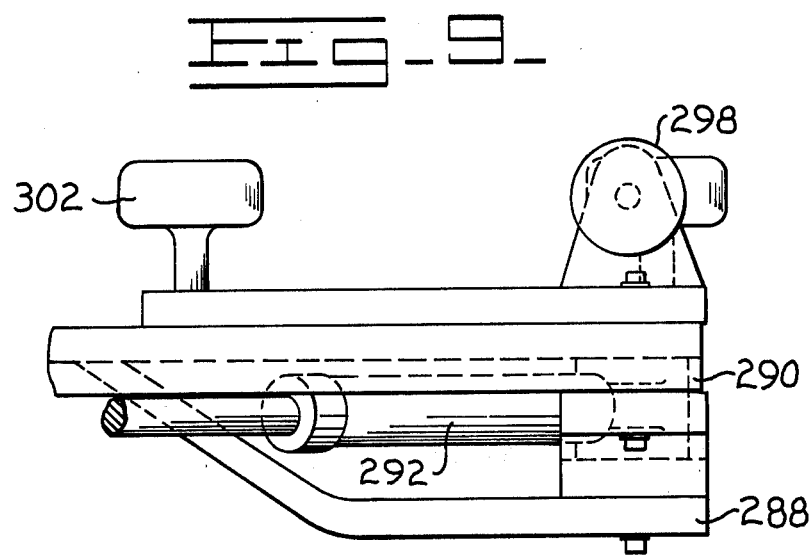
Fig-9-

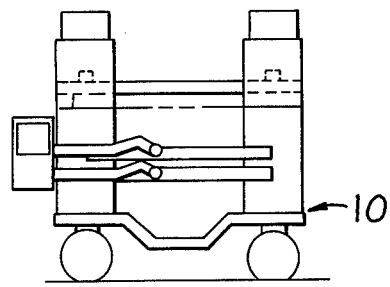
FIG_10_
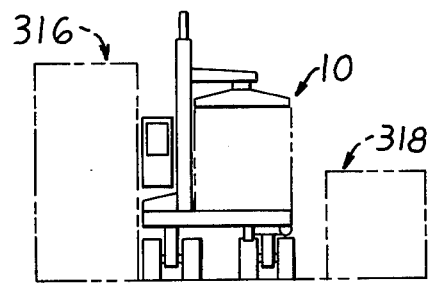
FIG_11_
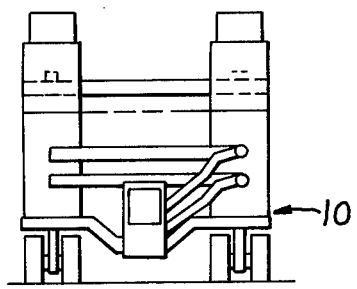
FIG_12_
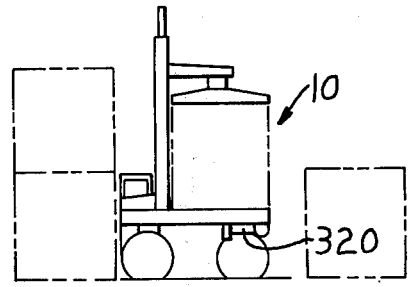
FIG_13_
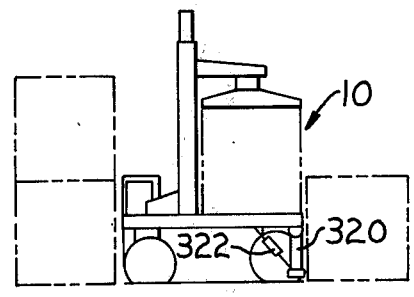
FIG_14_
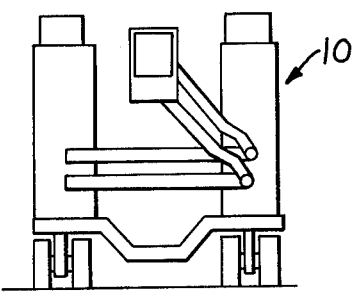
FIG_15_
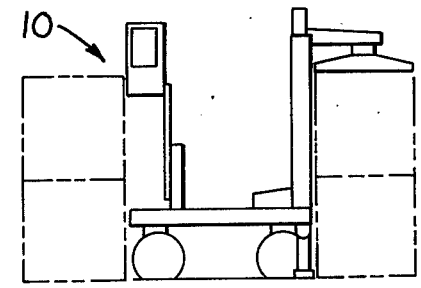
FIG_16_

HEAVY LIFT SIDE LOADER TRUCK

BACKGROUND OF THE INVENTION

This invention relates generally to a load handling vehicle. More particularly, this invention relates to a vehicle designed to carry long and heavy loads in relatively narrow aisles, and which has the ability to travel at right angles to the direction of travel for stacking purposes.

Currently there is a great demand in industry for a vehicle capable of handling heavy loads. Users of such loader vehicles include: the building industry; the logging industry; steel mills; miscellaneous fabrication plants; ship terminals; airports; and many other facilities. The loader vehicle has special application to the transporting and stacking of containers, such as ISO (International Standards Organization) containers used extensively to ship a wide variety of goods on multiple modes of transportation, such as ships, trucks, trains, planes, etc.

It may be parenthetically noted that while this disclosure talks mainly in terms of loads in the form of containers, such is merely for the sake of convenience. One of the principal applications of the inventive loader vehicle would be to transport containers. The loader vehicle would also be suited to carry other long and heavy loads. For example, loads such as logs, lumber, pipe, rolled steel, concrete and steel beams, and laminated wood beams would also be within the purview of the load type capability of the subject vehicle. It is contemplated that various load holding means such as grapples might be substituted for the normal forks, depending on the particular load.

In industry today there is a general disadvantage of lack of versatility of container or other load handling vehicles. That is, special purpose machines have had to be built for narrow aisle applications, rather than having a universal or multi-purpose loader vehicle. No single machine or loader vehicle has been capable of performing all of the multitude of jobs, for example, in high density and volume container marshalling yards while utilizing yard space to a higher degree than is presently possible.

Some of the prior art devices include conventional side loaders, straddle carriers, and cranes. Examples of some of these devices may be found by having reference to U.S. Pat. No. 3,586,183 to Shaffer and U.S. Pat. No. 3,669,290 to Doyle, both assigned to the Assignee hereof. Other examples may be found in U.S. Pats. No. 2,773,612 to West et al and 2,996,206 to McKee.

Where operating room permits the use of wide aisles, and operator visibility and load and vehicle stability are not problems, long loads are often carried on conventional lift truck vehicles. U.S. Pat. No. 3,207,249 to Singer et al is exemplary of such a lift truck vehicle.

The above-described loader vehicles have not proven to be entirely satisfactory for various reasons. With the standard lift truck, very long containers, e.g. 40 foot, require that the load be carried cross-wise. This necessitates corresponding 40 foot wide-plus aisles, which are not the most economic utilization of storage space. In addition, 40 foot wide containers carried cross-wise are difficult to maneuver.

Straddle carriers, both stacking and non-stacking, are preferable to lift trucks and are perhaps the most popular means for handling containers. These straddle carriers can negotiate aisles with containers in end-wise relation, thus requiring aisles only slightly wider than the typical 8 foot container width. However, these straddle carriers do have their limitations. For instance, as the need for greater storage density increases in importance, one of their limitations is met. Straddle carriers must "circus load", which refers to the characteristic need to enter a row always from an end. The straddle carrier is unable to select or deposit a load at random positions within a row without traveling in from one end. The exit mode is similarly restricted with straddle carriers.

Conventional side loaders also suffer from deficiencies. While they can meet the requirement of higher storage density by block stacking, i.e. stacking containers on top of each other in tiers, they have limitations in their selectivity in retrieval. They also have limitations in load capacity in the upper storage tiers. That is, they have limitations in the weight of containers or loads that they can successfully stack.

SUMMARY AND OBJECTS OF THE INVENTION

It is to overcome some or all of the above-noted limitations of the prior art loader vehicles that the instant invention is directed. The instant invention provides a device for moving and storing heavy loads that may be of very long length. The invention is in the form of a relatively compact heavy lift side loader vehicle that is able to negotiate even unpaved, slightly improved terrain. Due to its compactness and maneuverability, the vehicle is very economical in its utilization of yard space. In this regard, it is able to match the space utilization of conventional side loaders, side cranes and stacking straddle carriers. The loader vehicle of this instant invention is not only competitive with the conventional side loader, but unlike the straddle carrier is free from the necessity to circus load. In addition, the instant loader vehicle is capable of stacking heavy loads in the higher storage tiers, unlike the conventional loaders which have diminished load capacity in the higher tiers.

In addition to compactness, other advantageous features include its use of two masts instead of one and its provision for effectively increasing its width to improve its counterbalance and stability. This, of course, is of great desirability when loading and unloading to the vehicle side and especially with multi-tier loading.

Another feature is its ability to travel at right angles to its normal travel path. This facility enables entering the stack to "block stack" containers more than one row deep. When used for block stacking, the loader vehicle of the instant invention is able to store 50 percent more containers in a given space than a stacking straddle carrier can. In addition, the subject loader vehicle is capable of entering the blocks along any of the rows, which capability enables selective segregation within the block.

The invention more particularly takes the form of a vehicle having load capacities in the range of between 50,000 pounds and 125,000 pounds. However, these figures are not rigid. There is no technical weight limitation that limits the vehicle to this load range. Smaller or larger machines could be constructed which would have corresponding smaller or larger load capacities.

In structure, the instant inventive loader vehicle is a side loader having a body or chassis fitted with a pair of traversing masts which are mounted adjacent the front and rear of the vehicle. The masts are capable of traversing from the left to the right hand side of the vehicle. A load may be held suspended from booms pivotally suspended from a horizontal spreader fixed to the masts. Twist locks on the extremities of the booms enable engaging and disengaging the container loads. During the roading phase, the masts are traversed to the left and the load lowered so as to rest on the vehicle body. This feature enables the masts to be significantly lighter than would otherwise by the case. A further advantage to this arrangement is that the torsional loading impressed on the mast is significantly less than would otherwise be the case.

The pivotal movement capability of the booms has an additional advantage. This is the capability of permitting a controlled swing so as to function as a sideshifter motion when spotting or approaching a container. Of course, where loads other than containers are concerned, these booms would be replaced by other load handling devices, e.g. forks or grapples.

An operator's cab is provided on the vehicle which is carried by a pair of parallel lift arms in a pantograph arrangement. The cab may be positioned by power means to the front or rear of the vehicle as required for operator visibility, etc. This provides a wide variety of cab positions at the operator's discretion.

The chassis or body of the vehicle is comprised of two nearly identical modules each supported by two road wheels. Each module is generally symmetrical about a vertical plane through the centerlines of the righthand and lefthand road wheel suspensions. The two modules are joined together by a longitudinal frame which forms the backbone of the vehicle and contains all of the power and other related equipment such as controls.

In order to provide adequate stability when the vehicle is picking up or depositing a load, provision is made for the vehicle to stretch sideways. This is accomplished by having the modules constructed in two telescoping pieces or halves which may be laterally extended or contracted. Extension or contraction may be easily achieved by first swiveling the wheels at all four corners of the vehicle to a position which is 90° to the longitudinal vehicle direction. To effect extension or retraction, the wheels are merely driven to effect relative movement between the module halves.

It is therefore the primary object of this invention to provide an improved loader vehicle.

It is also an object of this invention to provide a loader vehicle that is capable of carrying long and heavy loads.

It is a further object of this invention to provide a loader vehicle that is capable of block stacking long and heavy loads.

It is a still further object of this invention to provide a loader vehicle with improved stability characteristics.

It is a still further object of this invention to provide a loader vehicle that enables improved operator visibility.

It is yet another object of this invention to provide a side loader vehicle having the capability of moving at right angles to the normal direction of travel in order to pick up or deposit loads.

These and other objects and advantages will become more readily apparent from a review of the following description which makes reference to the accompanying drawings.

BRIEF DESCRIPTION OF THE DRAWINGS

FIG. 1 is a front, top quarter isometric view of the side loader vehicle of the instant invention;

FIG. 2 is a rear, top quarter isometric view of the same illustrating the operator cab;

FIG. 3 is a rear vertical end elevation view of the side loader vehicle showing in phantom the lateral extended position of the frame with the mast fully traversed for load pickup or deposit;

FIG. 4 is an exploded isometric view of a module with halves separated and a lift mast partly cut away;

FIG. 5 is a cross-sectional view of a single module and illustrating the telescoping construction of the module halves;

FIG. 6 is a schematic view of the steering and motor drive systems for the wheels;

FIG. 7 is a left side vertical elevation view of the loader vehicle showing a cab position showing in phantom two additional cab positions;

FIG. 8 is a partial cross-sectional view taken along lines 8—8 in FIG. 7;

FIG. 9 is a view taken along lines 9—9 in FIG. 7 with structure removed for purposes of clarity; and FIGS. 10-16 are schematic views illustrating the work cycle sequence of the loader vehicle.

DETAILED DESCRIPTION

Turning to FIGS. 1 and 2 of the drawings, there is shown generally at 10 the load handling vehicle of the present invention. The vehicle comprises a generally elongated body shown generally at 12. The body 12 is, in turn, comprised of front and rear modules 14,16 respectively. The modules are connected together by an intermediate main frame 18.

The modules 14,16 are comprised of right and left telescoping portions 20,22 and 24,26, respectively, as will be more fully hereinafter described. Each module 14,16 is supported by right and left wheel assemblies 28,30 and 32,34, respectively. The wheel assemblies are, in turn, comprised of wheels 36,38,40,42,44,46,48,50. While two wheels are shown with each wheel assembly, alternate constructions may use one or a plurality of wheels with each wheel assembly. The wheel assemblies 28,30,32,34, further include suspension legs 52,54,56,58, respectively.

Within the body 12 are power and control means (not shown) for driving the wheels and thereby imparting motion to the vehicle 10. Also within the body are power and control means (not shown) for effecting steering of the vehicle. Other power and control means (not shown) are also located within the body for serving the other vehicle systems as will be hereinafter described.

Mounted on vehicle body 12 are a pair of traversing mast assemblies. Forward or front mast assembly 60 is mounted for traversing front module 14. Rear mast assembly 62 is mounted for traversing rear module 16. Interconnecting the mast assemblies is an elongated spreader 64. Depending from the spreader at the front and rear ends thereof are cross-wise elongated load handling beams 66,68 which are pivotally connected thereto by pivots 70,72, respectively. Twist locks 74,76,78,80 depend from the under extremities of the beams for engaging container top corner castings of a load container (not shown).

With particular reference to FIG. 2, the vehicle operator cab 82 is shown mounted on the vehicle by a pantograph, support assembly 84 for selective vertical movement. A longitudinal rail assembly 86 enables longitudinal movement of the cab. A plurality of glass windows 88 in the cab allow for operator visibility. Controls (not shown) in the cab enable the operator to control all of the vehicle functions therefrom, including the raising and lowering of the cab. Having thus described the overall vehicle arrangement, the various major components will be described with more particularly.

Mast Assemblies

As shown in FIGS. 1 and 2, the side loader vehicle 10 has mounted thereon a pair of traversing mast assemblies 60,62 located adjacent the vehicle front and rear ends, respectively. The elongated spreader or separator 64 is connected to the support booms in a manner that enables the masts to be operated independently but in a coordinated manner so as to approximately equally share the load between the masts. In the vehicle roading phase, mast assemblies 60,62 are fully traversed to their leftmost position adjacent the vehicle left side as shown. In this roading phase, the load (not shown) is thus enabled to rest on the bed formed by front and rear modules 14,16. The mast assemblies comprise U-shaped, generally elongated vertical front and rear telescoping masts 90,92. The telescoping masts include extensible, vertically movable masts 94,96 telescoped within vertically stationary masts. Masts 94,96 are raised and lowered by means of vertically oriented hydraulic cylinders 98,100.

Movably mounted on each mast is a carriage 110,112, each mounting a support boom 114,116, respectively. Vertical movement is imparted to carriage 110,112 by chains 102 and 104 directed over rollers 106 and 108. The support booms 114,116 are generally L-shaped and have a horizontal portion 118,120 from which the elongated spreader 64 flexibly depends, as best seen in FIG. 1. Extension or retraction of the cylinder rods 122,124 of cylinders 98,100 causes masts 94,96 to be raised or lowered. For applications other than container handling, support booms 114,116 could be replaced by other load holding means such as grapples or forks.

Container Holding Arrangement

As best seen in FIG. 3, the means for holding one end of a container comprises an elongated beam 68 pivotally connected midway between its end to spreader 64. In order to maintain the beam in horizontal relation, a closed hydraulic cylinder or damper 126,128 is interconnected between spreader 64 and beams 68,70, as seen in FIGS. 1 and 2. By selecting an appropriate length for spreader 64, various length containers can be handled by the load vehicle. Twist locks 74,76,78,80 depending from the underside of booms 66,68, are used for engaging load containers, by mechanisms (not shown) contained within the beams.

Traversing Masts

For loading and unloading which is done adjacent the right side of the vehicle, the front and rear masts 90,92 are traversable from the left to the right side of the body on rails 130,132 and 134,136 formed on the front and rear sides of modules 14,16, respectively, as best seen in FIG. 1. Each of masts 90,92 is supported by a plurality of wheels or rollers 138,140. With the arrangement shown in FIGS. 1 and 2, four rollers support each mast. Mast motors 141,142 serve to motivate the masts to traverse the rails. Each motor 141, 142 drives a roller on the side of the mast on which it is mounted as well as on the opposite side by means of a plurality of chains 146,148,150,152 and sprockets 154,156,158,160, by means of a cross shaft 162,164, respectively. By proper synchronization of motors 141,142 through control means (not shown) both mast assemblies 60,62 can be traversed in or out of unison as desired.

Extensible Modules

In order to provide lateral stability needed for side loading without the necessity of adding unproductive dead weight in the form of counterweights, the loader vehicle includes laterally extensible modules 14,16 which enable the vehicle to effectively stretch sideways. FIGS. 4 and 5 show the details of construction of a single one of the modules. As best seen in FIG. 4, the movable outer member 24 telescopes with stationary inner member 26. Movable outer member 24 is generally U-shaped, having a space therebetween defined by a pair of bifurcated arms 166,168. Inner member 26 is a generally elongated member adapted to telescope within the space between the bifurcated arms. Rails 170,172 are provided within the space at the rightmost portion of arms 166,168, respectively. Similar rails 174,176 are provided on stationary inner member 26. Rollers 178,180 on the rightmost side portions of member 26 are rotatably secured thereto and arranged to travel within rails 170,172. In like fashion, rollers 182,184 on the inner extremities of arms 166,168 travel in rail channels 174,176 of movable inner member 26. As best seen in FIG. 5, rollers 182,184 are rotatably secured to the bifurcated arms by pins 186,188, respectively.

The movable outer member 24 is mounted in fixed relation to the main frame such that the stationary inner member 26 is extensible relative thereto in a lateral or transverse direction. To achieve this extensibility, load side wheels are turned 90° to the direction of travel and the load side wheels powered so as to draw or telescope outwardly the movable outer member 24 from the stationary inner member 26. As will be hereinafter more fully described, stop means on the rails (not shown) serve to limit the rightward extension so that the rollers always remain on the rails. Conversely, the transverse frames may be telescoped back to their normal or roading phase by merely reversing the direction of rotation of the load side wheels and driving the movable outer member into the stationary inner member.

The power means for driving the wheels (not shown) may be conveniently a conventional hydraulic wheel drive motor located within each wheel hub as at 190,192,194,196. Such a unit is Power Wheel No. 8 manufactured by Borg-Warner Corporation. Alternatively, other types of drive such as electric or chain drive may be used in place of the hydraulic motor drive disclosed.

Steering and Drive Systems

As best seen in FIG. 6, the steering system comprises a pair of transversely oriented steer cylinders 198,200. Front steer cylinder 198 includes a piston 202 fixed intermediate the ends of projecting rod 204. In like manner, steer cylinder 200 includes piston 206 intermediate the ends of rod 208.

The ends of rod 204 are pivotally connected to levers 210,212 by pivots 214,216. In like fashion, the ends of rod 208 are pivotally connected to levers 218,220 by means of pivots 222,224. In steering the vehicle, the operator's steering wheel (not shown) which is located in the cab is manually turned to the left or counterclockwise direction which causes the steering control 226 to direct hydraulic fluid to the left ends of cylinders 198,200 through conduits 227,228. Conversely, for a right turn the fluid is directed to the left ends of the cylinders through conduits 230,232.

As shown in FIG. 5, a typical left side suspension leg 56 is mounted for rotation with respect to its supporting portion 24 by means of a generally cylindrically shaped collar or yoke 234. A lever or steering arm 220 is fixed to the suspension leg which is comprised of upper and lower legs 236,238, respectively. The upper and lower legs are also relatively rotatable about their axis by means of intermediate steering control 240. Steering control 240 may be a "Hydroac" unit as will be hereinafter described.

The drive system comprises first and second drive controls 242,244, respectively. The first drive control directs hydraulic fluid to the left or cab side drive motors 192,196 through conduits 246,248 in one direction of motor rotation or through conduits 250,252 to go in the other direction of motor rotation. Similarly, second drive control 244 directs fluid alternatively through conduits 254,256 or conduits 258,260.

In the roading phase or mode, both the first and second drive controls deliver the same amount of hydraulic fluid flow to the left and right drive motors with the vehicle wheels in the longitudinal direction. By controlling the fluid flow, the vehicle may be made to travel at various speeds.

The steering and drive systems are also used for extending the vehicle in a lateral or transverse direction. To extend the vehicle, the load side wheels 28,32 are indexed 90° to the direction of travel by actuating rotary actuators (not shown) within each of the load side suspension legs 52,56. A Hydroac hydraulic rotary actuator produced by Houdaille Industries, Inc. is suitable for the described purpose.

The thus described indexing to the transverse direction is accomplished by second drive control 244 independently directing fluid flow from the vehicle fluid pressure source (not shown). The rotary control 262 exerts pressure on the hydraulic steer cylinders 198,200 causing the steering levers to move the yokes to a position wherein they are transversely outwardly open, thus freeing the extendible frame for transverse movement. Exemplary of this is yoke 234 in FIG. 4 having open slot 264 with a curved back portion and straight side portions. Slot 264 receives suspension leg 56 and mates with correspondingly shaped drive lug 235 when the transverse frames are telescoped together. The drive lug when fully seated within yoke 234 allows steering motion to be transmitted through the yoke to the wheels 32.

As the next step, second drive control 244 delivers fluid in proportion to the speed desired to the load side drive motors powering the load side wheels 28,32. At the same time, the first drive control 242 is rendered inoperative by a signal interconnection with rotary control 262.

As an alternate embodiment, the cab side wheels 30,34 would also be provided with rotary actuators. These actuators would also be controlled by rotary control 262 by additional interconnections. With this alternate embodiment all wheels could be rotated 90° to the direction of travel and the entire vehicle driven into the stack with the transverse frame in extended or retracted position. Also with this embodiment the vehicle would be extended by applying brakes (not shown) on the cab side wheels 30,34 while simultaneously powering the load side wheels 28,32. This arrangement has an advantage in decreasing bearing side loading and tire roll on the wheel rims of the cab side wheels which would otherwise be imposed when in their longitudinal direction while the frame is being extended.

Movable Operator's Cab

Turning to FIGS. 7-9, there is shown the structure for enabling movement of the operator's cab 82. Cab 82 is mounted on a pantograph assembly 264 comprising a lift arm 266 in a generally parallel relation with a control arm 268. The control and lift arms are connected to cab 82 by means of pivots 270,272. The opposite ends of the arms are similarly pivotally connected by means of pivots 274,276 to carriage 278 which is traversable in a longitudinal direction on parallel upper and lower cab support rails 280,282, respectively. The lift and control arm 266,268 are dog-legged at 284,286, respectively, for the purpose of clearing the base of the rear mast carriage 90. In some cases, the dog leg will not be required depending on the configuration of the mast carriage.

As best seen in FIGS. 8 and 9, control arm 268 is bifurcated into a pair of bifurcated arms 288,290 at its point of pivotal connection with carriage 278. This adds lateral stability necessary due to the torque imposed by the overhanging cab structure 82. A cab hydraulic lift cylinder 292 is mounted between the lift arm and the carriage by pivots 294,296. In this manner, the hydraulic cylinder 292 may be actuated by control means within the cab (not shown) to raise or lower the cab as shown at 82' and 82''.

In order to be longitudinally movable relative to the vehicle, the carriage 278 has three rollers 298,300,302 rotatably mounted thereon. These rollers travel in the supporting cab support rails 280,282. Rollers 298,300 are mounted on horizontal axes and together carry the vertically downwardly imposed load of the cab and its pantograph assembly. Since rail 282 is C-shaped, these rollers also cooperate to resist the moment imposed by the longitudinal overhang of cab 82. Thus, the cab support rail 282 acts both to resist vertically upward and vertically downward forces imposed thereon by the rollers in contact therewith.

In order to resist the transverse moment created by the overhanging cab 82, remaining roller 298 is oriented about a vertical axis. This roller cooperates with C-shaped rail 280 and with the -ransverse reaction of rollers 300,302 to resist forces created by such moment.

In order to motivate the carriage and attached pantograph assembly and cab longitudinally with relation to the vehicle frame in order that it may attain various positions such as the cab high position 82' or cab approach position 82'' from the normal cab transport position 82, a rodless hydraulic cylinder 304 by the type marketed under the trademark or name "Toll-o-matic" is provided. Rather than using a rod, this type of cylinder uses a wire rope or cable 306 extending from both ends of the cylinder. The wire rope is endless and is attached to a piston (not shown) within the cylinder body. The looping ends of the rope are wrapped around pulleys or sheaves 308,310 at opposite ends of upper cab support rail 280. The intermediate end of wire rope 306 is secured to carriage 278 by means of bracket 312 bolted thereon as best seen in FIG. 8. In this manner, movement of the piston 314 in cylinder 304 is exactly duplicated by the bracket 312, which imparts a corresponding movement to the carriage along the cab support rails 280,282. A real advantage of using this type of cylinder in this application is that the length of the cylinder assembly is only a few inches greater than the stroke of the bracket. Thus, space is convserved and the assembly is easily fitted between the vehicle mast. Again, control of the cylinder can be accomplished from a control within the cab (not shown).

Vehicle Operation as a Container Handler

FIGS. 10–16 show an exemplary typical work cycle sequence of the load handling vehicle of the instant invention as a container handler. FIGS. 10 and 11 show the vehicle in the transport mode. FIGS. 12 and 13 show the load handling vehicle in the approach mode.

FIG. 14 shows the vehicle with the frame extended.

Remaining FIGS. 15 and 16 show the load handling vehicle with the masts traversed.

In particular, in the transport mode (see FIGS. 10 and 11) the vehicle is driven down an aisle formed between the closely-stacked containers 316,318, with the cab in the normal or roading transport position as shown. The operator controls the vehicle to position same laterally opposite the container stack. To facilitate this, a guide line may be painted on the vehicle surface as a mark.

In the approach mode (see FIGS. 12 and 13) the wheels are indexed 90° to the longitudinal direction of travel. The cab is moved laterally back and downward to facilitate operator visibility during un-loading. The frame is extended (see FIG. 14) to substantially fill the aisle and provide needed support. As shown, a small outrigger 320 may be pivotally connected to the vehicle on the load side corners to provide added support during loading and unloading. This outrigger 320 may be manually raised from a position substantially parallel to the vehicle frame and lowered to a position substantially vertical to the vehicle frame, but is more preferably hydraulically powered by means of hydraulic cylinder 322 pivotally connected intermediate the frame and the outrigger. It should be noted that the length of the outriggers is such that they do not touch the ground in the normal situation when the load is over the frame of the vehicle. However, when the load is being handled and is being moved outboard of the vehicle, the deflection of the load side tires will bring the outriggers into play as the vehicle tilts over.

Continuing with the sequence, the carriage is raised and the masts are then traversed out onto the extended frame (see FIGS. 15,16) and the cab raised to the load high position shown for improved operator visibility for detaching the twist locks to the load container. The load is then raised and the mast traversed toward the stack, whereupon the load is deposited in the load space. The cycle is then completed by reversing the steps. The outriggers are raised, the frame is retracted, the wheels are again turned to the longitudinal direction, and the vehicle again driven down the aisle.

If a load container is to be handled in the second space or beyond, the above set out steps would be slightly modified by the necessity of first driving the vehicle into the stack before handling the load. With this situation, the operator must first position the cab so as not to protrude beyond either end of the vehicle. The approach position shown in FIGS. 12 and 13 will probably be most suitable for this purpose. In this manner the operator may see under the load.

It is to be understood that the invention is not to be restricted to the embodiments here disclosed but is to be determined by the scope of the appended claims.

What is claimed is:

1. A load handling vehicle comprising a generally elongated main frame, front and rear transverse frame modules fixed to front and rear ends of said main frame, wheel assemblies mounted adjacent opposite ends of said transverse frame modules, all of said wheel assemblies being steerable, each said module comprising a stationary member and a movable member, front and rear mast assemblies mounted for transverse movement respectively on said front and rear modules, said mast assemblies comprising respectively front and rear vertically extensible masts, load handling means mounted on said masts for picking up and depositing a load to be handled, power and control means for motivating and steering said vehicle and raising and lowering said masts, and means for telescoping said stationary member with respect to said movable member whereby the vehicle may be extended in the transverse direction, said wheel assemblies comprising first wheels being attached to said movable member, which are steerable relative to second wheels of said wheel assemblies, said second wheels being mounted on said stationary member whereby when said movable member is moved said first wheels are aligned in the direction of movement of said movable member 2. The invention of claim 1 wherein said movable member has a pair of bifurcated arms defining a space therebetween, said stationary member is a generally elongated member adapted to fit in said space and wherein said means for telescoping comprises rails on opposite sides of said stationary member receiving rollers on the ends of said bifurcated arms within said space, and rails on said bifurcated arms within said space receiving rollers on said stationary member.

3. The invention of claim 2 wherein said rails on said stationary member extend only part way along its length and wherein said rails on said movable member extend only part way along its length.

4. The invention of claim 3, wherein said rails on said stationary member and said movable member are generally C-shaped.

5. The invention of claim 1 wherein each mast assembly further comprises a movable carriage and wherein said front and rear masts are vertically extensible, and wherein said power means for raising and lowering said masts comprises a hydraulic cylinder mounted on each mast assembly.

6. The invention of claim 1 further including means for traversing said mast assemblies on said modules to enable picking up and depositing loads laterally of said vehicle.

7. The invention of claim 6 wherein said means for traversing said mast assemblies comprise rails on said modules receiving rollers on said mast assemblies.

8. The invention of claim 7 wherein said means for traversing further comprise motor means mounted on said mast assemblies driving at least one roller on each of said mast assemblies.

9. The invention of claim 8 wherein said mast assemblies include generally U-shaped vertically stationary masts defining bifurcated arms and include rollers rotatably mounted on said arms, said motor means comprises a motor on each vertically stationary mast, and wherein a cross-shaft is provided passing through said bifurated arms for transmitting power from said motor means to a roller on each of said arms.

10. A load handling vehicle comprising a generally elongated main frame, front and rear transverse frame modules fixed to front and rear ends of said main frame, wheel assemblies mounted adjacent opposite ends of said transverse frame modules, front and rear mast assemblies mounted for transverse movement respectively on said front and rear modules, said mast assemblies comprising respectively front and rear vertically extensible masts, load handling means mounted on said mast for picking up and depositing a load to be handled, carriages mounted on said vertically extensible mast, said load handling means comprising a boom extending in a generally horizontal direction mounted on said carriages on said vertically extensible masts, and a generally elongated beam extending between each of said booms and mounted thereto, each end of said beam having a load handling and gripping means mounted thereon, and further including power and control means for motivating and steering said vehicle and raising and lowering said masts.

11. The invention of claim 10 wherein said load handling means mounted on each end of said beam comprises an elongated beam pivotally connected adjacent opposite ends of said.

12. The invention of claim 11 further including a damper means intermediate said elongated spreader and each said beam for damping arcuate movement thereof.

13. The invention of claim 12 wherein said load handling means further include twist locks for engaging container top corner castings adjacent the elongated beam ends.

14. The invention of claim 1 wherein each of said wheel assemblies comprise a generally vertical wheel support member, at least one wheel rotatably mounted on the lower end of said wheel support member, and means pivotally securing said vertical wheel support member to said vehicle for rotation about a generally vertical axis.

15. The invention of claim 14 wherein said means for steering said vehicle includes hydraulic cylinder means on said vehicle for rotating each said wheel support member about said generally vertical axis.

16. The invention of claim 15 wherein said hydraulic cylinder means for rotating comprise front and rear hydraulic steering cylinders mounted on said vehicle.

17. The invention of claim 16 wherein said steering cylinders each comprise a hydraulic cylinder having a piston and a rod therein, and wherein the rods thereof extend from both ends of the cylinder.

18. The invention of claim 17 wherein said means for securing said vehicle wheel support member includes a lever thereon, and wherein each said lever is pivotally connected to a respectively steering cylinder rod such that actuation of said steering cylinders causes movement of said wheel assemblies to steer the vehicle.

19. The invention of claim 14 including a rotary control means on each said wheel assembly on one side of said vehicle whereby the wheel assemblies on said one side of said vehicle may be pivoted.

20. The invention of claim 19 further including a rotary control means on each wheel assembly on the side of said vehicle opposite said one side whereby the wheel assemblies on said other side of said vehicle may be pivoted.

21. A load handling vehicle comprising a generally elongated main frame, front and rear transverse frame modules fixed to front and rear ends of said main frame, wheel assemblies mounted adjacent opposite ends of said transverse frame modules, front and rear mast assemblies mounted for transverse movement respectively on said front and rear modules, said mast assemblies comprising respectively front and rear vertically extensible masts, load handling means mounted on said masts for picking up and depositing a load to be handled, and power and control means for motivating and steering said vehicle and raising and lowering said masts, an operator cab on said vehicle and means for moving said cab relative to said vehicle, said means for moving said cab comprising upper and lower generally elongated parallel lift and control arms, respectively, said lift and control arms being pivotally secured to said cab at one end thereof, said means for moving further comprising a cab carriage, said cab carriage being movable longitudinally linearly of the vehicle, lift and control arms being pivotally secured to said carriage at the ends thereof opposite said one end so as to produce a pantograph arrangement.

22. The invention of claim 21 wherein said means for moving said cab cab further comprises power means on said carriage for raising and lowering said lift arms and thereby said cab.

23. The invention of claim 22 wherein said power means on said cab carriage comprises a hydraulic cylinder pivotally connected between said cab carriage and one of said parallel arms.

24. The invention of claim 21 wherein said means for moving said cab further comprises upper and lower, spaced longitudinally directed carriage rails on said vehicle frame, and roller means on said cab caraige cooperating with said cab carriage rails for longitudinal movement of said carriage with respect to said vehicle thereby moving said cab longitudinally with respect to said vehicle.

25. The invention of claim 24 wherein said rails are generally C-shaped and wherein said roller means comprise a plurality of rollers on said cab carriage within said C-shaped rails.

26. The invention of claim 25 further including power means on said vehicle for moving said cab carriage along said rails.

27. The invention of claim 26 wherein said power means comprises a hydraulic cylinder having a piston therein and a wire rope extending from both cylinder ends fixed to said cab carriage.

28. The invention of claim 27 including a pair of pulleys on said vehicle and wherein said wire rope is looped over said pulleys.

29. The invention of claim 1 further including outrigger means on said vehicle for providing added support during loading and unloading of said vehicle which is operative incident to normal tilting over of said vehicle when a load is being loaded or unloaded to the side of the vehicle.

30. The invention of claim 29 wherein said outrigger means comprise a pair of elongated outrigger members pivotally secured at an end thereof to the vehicle corners on one side of the vehicle whereby said outrigger members may be moved from a stowed position substantially parallel to said vehicle frame to an operative position substantially vertical to said vehicle frame.

31. The invention of claim 30 further including power and control means on said vehicle for raising and lowering said outrigger members.

32. The invention of claim 31 wherein said power and control means for raising and lowering said outrigger members comprises a hydraulic cylinder pivotally connected intermediate said vehicle frame and each respective outrigger member.

33. The invention of claim 1 wherein said wheel assemblies each comprise a pair of wheels.

34. The invention of claim 1 wherein said main frame has a central portion below the level of said modules, whereby loads deposited on said vehicle are supported by said modules.

* * * * *

UNITED STATES PATENT OFFICE
CERTIFICATE OF CORRECTION

Patent No. 4,024,968             Dated May 24, 1977

Inventor(s) Walter M. Shaffer, et al

It is certified that error appears in the above-identified patent and that said Letters Patent are hereby corrected as shown below:

Col. 11, line 18, "mast" should be --masts--.

Col. 11, line 32, insert --spreader beam-- between "said" and the period (.) at the end of the line.

Col. 11, line 34, delete "elongated".

Col. 11, line 35, insert --elongated-- after "said".

Col. 12, line 30, delete "cab" (first occurrence).

Col. 12, line 31, insert --cab-- after "said" (first occurrence).

Col. 12, line 40, "carraige" should be -carriage--.

Col. 12, line 42, insert --cab-- after "said" (first occurrence).

Signed and Sealed this

Twenty-ninth Day of August 1978

[SEAL]

Attest:

RUTH C. MASON
Attesting Officer

DONALD W. BANNER
Commissioner of Patents and Trademarks